United States Patent
Johansson et al.

(10) Patent No.: US 10,470,196 B2
(45) Date of Patent: Nov. 5, 2019

(54) METHOD FOR LOAD REDISTRIBUTION IN MOBILE COMMUNICATION SYSTEMS

(71) Applicant: HFI INNOVATION INC., Zhubei, Hsinchu County (TW)

(72) Inventors: Per Johan Mikael Johansson, Kungsangen (SE); Chia-Chun Hsu, New Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/240,060

(22) Filed: Aug. 18, 2016

(65) Prior Publication Data

US 2017/0055188 A1 Feb. 23, 2017

Related U.S. Application Data

(60) Provisional application No. 62/208,086, filed on Aug. 21, 2015.

(51) Int. Cl.
*H04W 72/10* (2009.01)
*H04W 48/16* (2009.01)
(Continued)

(52) U.S. Cl.
CPC ........... *H04W 72/10* (2013.01); *H04W 36/22* (2013.01); *H04W 48/16* (2013.01); *H04W 28/08* (2013.01);
(Continued)

(58) Field of Classification Search
CPC .............................. H04W 72/10; H04W 48/16
See application file for complete search history.

(56) References Cited

U.S. PATENT DOCUMENTS

| 7,860,503 B2* | 12/2010 | Moon ................. H04W 72/005 455/436 |
| 2010/0273485 A1* | 10/2010 | Huang ................. H04W 36/34 455/435.3 |

(Continued)

FOREIGN PATENT DOCUMENTS

CN 1863405 A 11/2006

OTHER PUBLICATIONS

International Search Report and Written Opinion of International Search Authority for PCT/CN2016/095994 dated Nov. 9, 2016(11 pages).

(Continued)

*Primary Examiner* — Redentor Pasia
(74) *Attorney, Agent, or Firm* — Oblon, McClelland, Maier & Neustadt, L.L.P.

(57) ABSTRACT

Methods and apparatus are provided for load balancing and load distribution using a set of alternative configurations. In one novel aspect, the UE receives and stores a set of alternative configurations. The UE selects a new alternative configuration upon detecting one or more triggering events and performs a cell selection based on the new alternative configuration. In one embodiment, the UE receives the set of alternative configurations from a broadcast signaling channel. In another embodiment, the UE applies a new configuration upon detecting one or more triggering events. In another embodiment, the UE selects the new alternative configuration using a hash function based on a UE identifier, wherein the hash function hashes to a priority class, and wherein each priority class maps to an alternative configuration. In one embodiment, a prohibition timer is used to prevent too frequent resource changes.

16 Claims, 6 Drawing Sheets

(51) Int. Cl.
*H04W 36/22* (2009.01)
*H04W 28/08* (2009.01)
*H04W 36/00* (2009.01)
*H04W 36/36* (2009.01)

(52) U.S. Cl.
CPC ........ *H04W 36/0072* (2013.01); *H04W 36/36* (2013.01)

(56) References Cited

U.S. PATENT DOCUMENTS

| | | | | |
|---|---|---|---|---|
| 2013/0142104 A1* | 6/2013 | Lee | ............................ | H04W 4/06 370/312 |
| 2013/0303173 A1* | 11/2013 | Hole | ...................... | H04W 36/36 455/437 |
| 2014/0024382 A1 | 1/2014 | Zou et al. | ...................... | 455/445 |
| 2014/0094185 A1* | 4/2014 | Yiu | .......................... | H04W 4/70 455/453 |
| 2017/0223586 A1* | 8/2017 | Cui | ........................ | H04W 24/02 |

OTHER PUBLICATIONS

3GPP TSG-RAN Meeting #64 RP-140716, ZTE, Motivation for proposed SI: Study on UE distribution in Idle mode, Sophia Antipolis, France dated Jun. 10-13, 2014 (5 pages).
EPO, search report for the EP patent application 16838531.8 dated Jun. 7, 2018 (12 pages).
R2-143113 3GPP TSG RAN WG2 Meeting #87, ZTE Corp., "Hash algorithm based idle UE distribution", Dresden, Germany, Aug. 18-22, 2014 (6 pages).
R2-141314 3GPP TSG-RAN WG2 #85bis, Ericsson, "Idle mode load balancing improvements", Valencia, Spain, Mar. 31-Apr. 4, 2014 (7 pages). *last paragraph before section 2.5*.

* cited by examiner

METHOD FOR LOAD REDISTRIBUTION IN MOBILE COMMUNICATION SYSTEMS

CROSS REFERENCE TO RELATED APPLICATIONS

This application claims priority 62/208,086, entitled, "A METHOD FOR LOAD REDISTRIBUTION" filed on Aug. 21, 2015; the subject matter of which is incorporated herein by reference.

TECHNICAL FIELD

The disclosed embodiments relate generally to wireless communication, and, more particularly, to functionality for load redistribution or load balancing a physical data channel based on a chosen definition of resource block.

BACKGROUND

For Third generation partnership (3GPP) long term evolution (LTE) the current mechanism to steer where user equipments (UEs) are camping is based on priority based cell reselection, which is a mechanism where different carrier frequencies or different Radio Access Technologies (RAT) have different priorities and where a UE is always striving to camp on the highest priority frequency or RAT for which the radio conditions are sufficient. A configuration for priority based cell reselection can be provided to the UE by dedicated signaling when UE is in connected mode, or by broadcast signaling.

The current mechanism has the problem that to spread UEs over multiple carriers, e.g. in order to spread the load, dedicated signaling must be used. The current broadcast signaling provides the same configuration to all UEs. Therefore, without improvement, such broadcast configuration/message cannot be used \for load spreading purposes. A particular problem with using dedicated signaling is that UEs can only be controlled, i.e. their configuration can only be changed, when they are in connected mode, which is not necessary the point of time when it is suitable to perform the control. It makes it difficult to change configurations to do load balancing.

Improvement and enhancement are required for new configuration for the UEs to do load redistribution.

SUMMARY

Methods and apparatus are provided for load balancing and load distribution using a set of alternative configurations.

In one novel aspect, the UE receives a set of alternative configurations in a wireless network, wherein the alternative configuration configures a priority list of resources for a cell reselection. The UE stores the received set of alternative configurations and selects a new alternative configuration from the set of alternative configuration upon detecting one or more triggering events. The UE performs a cell selection based on the new alternative configuration, wherein a resource is selected based on the new selected alternative configuration.

In one embodiment, the UE receives the set of alternative configurations from a broadcast signaling channel. In another embodiment, each alternative configuration comprises a list of resources, and corresponding priorities for each resource listed, wherein each resource in the list of resources is selected from a resource group comprising: a radio frequency, a RAT, and a set of cells. In another embodiment, a priority maps to a set of sub-priorities. At least one of the corresponding priority is a sub-priority.

In one embodiment, the UE applies a new configuration upon detecting one or more triggering events. The triggering events may include: receiving a second set of alternative configurations that is different from the stored set of alternative configurations, the UE entering a cell, the UE entering an idle mode, and the UE entering another mode where a cell selection is applied. In another embodiment, the expiration of a validity timer is also a triggering event for a new configuration.

In one embodiment, the UE selects the new alternative configuration using a hash function based on a UE identifier, wherein the hash function hashes to a priority class, and wherein each priority class maps to an alternative configuration. In another embodiment, hash function is a value of the UE identifier modular a number of priority class. In yet another embodiment, the UE identifier is one selecting from an identifier group comprising: a temporary identifier provided to the UE at registration, a temporary identifier, an international mobile subscriber identity (IMSI), an equipment identifier, and an IEEE MAC identifier of an interface of the UE.

In one embodiment, a prohibition timer is used to prevent too frequent resource changes. The UE starts a prohibition timer upon selecting the new alternative configuration, prohibits a second selecting a new alternative configuration before the expiration of timer upon detecting one or triggering events, and selects a second alternative configuration upon an expiration of the prohibition timer and one or more triggering events was detected between the start of the prohibition timer and the expiration of the prohibition timer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
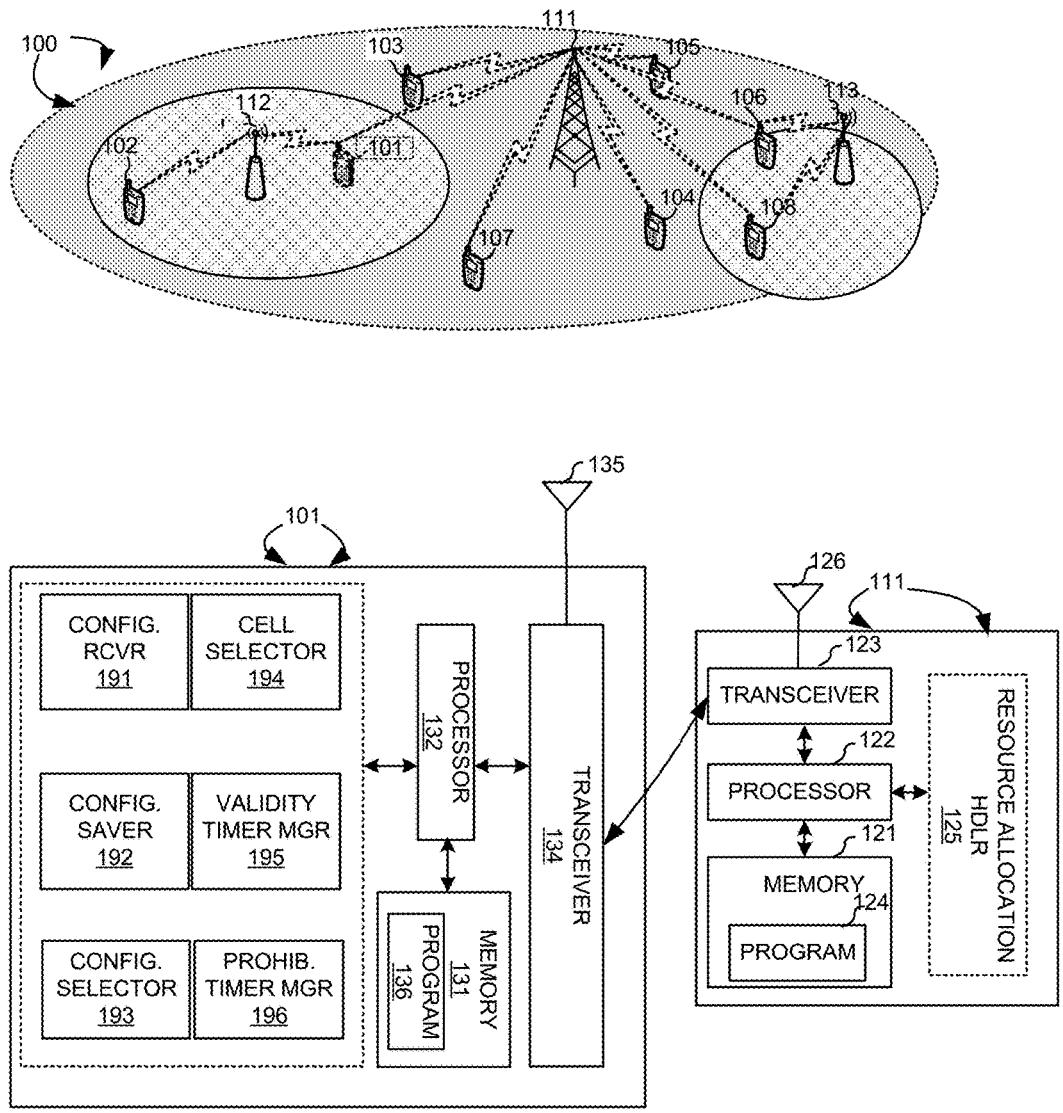
FIG. 1 illustrates an exemplary wireless communication network where the UEs can use different resources from different frequency channels and other RAT in accordance with embodiments of the current invention.

FIG. 1 illustrates an exemplary wireless communication network 100 where the UEs can use different resources from different frequency channels and other RAT in accordance with embodiments of the current invention. Wireless communications system 100 includes one or more fixed base infrastructure units, such as wireless communications devices 111, 112, and 113. The base unit may also be referred to as an access point, an access terminal, a base station, eNB, or by other terminology used in the art. Each of the wireless communications stations 111, 112, and 113 serves a geographic area.

Wireless mobile station or user equipment (UE) 101 and 102 in the wireless network 100 are served by base stations 111 and 112. (UE) 106 and 108 are served by base stations 111 and 113. Other wireless communications device, such as wireless communication device 103, 104, 105, and 107, are served by base station 111. Mobile station 101 and 102 send uplink data to base stations 105 and 106 via uplink channels in the time and/or frequency domain. For UE 101 to 108, each has multiple resources it can use. UEs 103, 104, 105, and 107 are served by different channels from mobile station 111. UEs 101 and 102 are served by resources of different RATs, including resources from mobile stations 111 and 112. Similarly, UEs 106 and 108 are served by resources of different RATs, including resources from mobile stations 111 and 113. In a priority based cell reselection procedure, it is important to distribute the resource among UEs.

FIG. 1 further shows simplified block diagrams of wireless stations 101 and base station 111 in accordance with the current invention. Base stations 112 and 113 have similar structure as shown in FIG. 1.

Base station 111 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 105. Memory 121 stores program instructions and data 124 to control the operations of base station 105. Base station 105 also includes a set of control modules, such as resource allocation handler 125 that carry out functional tasks to configure, execute and communicate with the wireless communications device 101 for resource allocation related tasks.

Wireless communications device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Wireless communications device 101 also includes a set of control modules that carry out functional tasks. A configuration receiver 191 receives a set of alternative configurations, wherein the alternative configuration configures a priority list of resources for a cell reselection. A configuration saver 192 stores the received set of alternative configuration. A configuration selector 193 selects a new alternative configuration from the set of alternative configuration upon detecting one or more triggering events. A cell selector 194 performs a cell selection based on the new alternative configuration, wherein a resource is selected based on the new selected alternative configuration. A validity timer manager 195 starts a validity timer upon receiving the set of alternative configurations and selects a new alternative configuration upon an expiration of the validity timer. A prohibition timer manager 196 starts a prohibition timer upon selecting the new alternative configuration, prohibits a second selecting a new alternative configuration before the expiration of timer upon detecting one or triggering events, and selects a second alternative configuration upon an expiration of the prohibition timer and one or more triggering events was detected between the start of the prohibition timer and the expiration of the prohibition timer.

Figure 2:
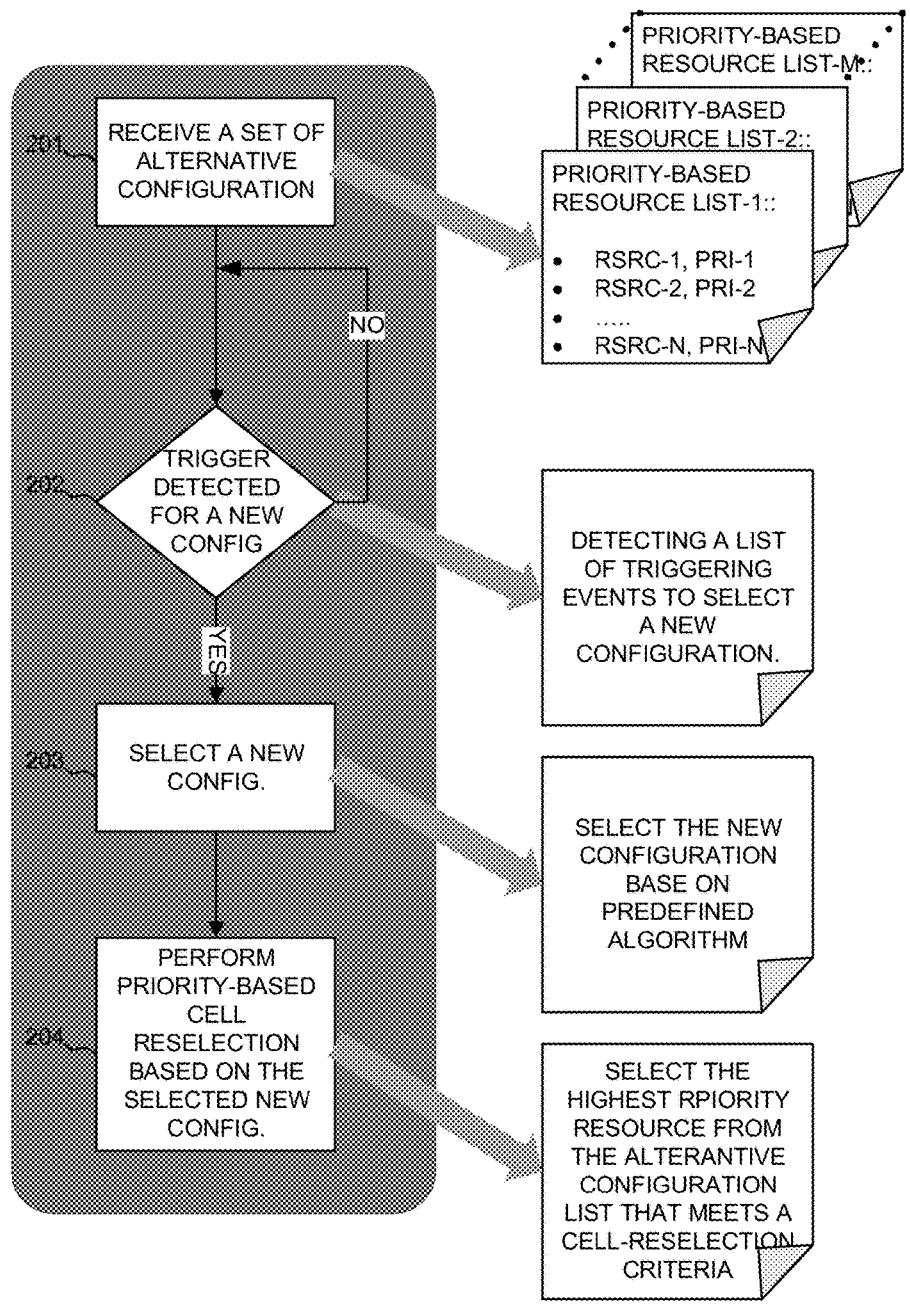
FIG. 2 shows an exemplary flow diagram for load balancing and load redistribution using alternative configurations in accordance with embodiments of the current invention.

FIG. 2 shows an exemplary flow diagram for load balancing and load redistribution using alternative configurations in accordance with embodiments of the current invention. At step 201, the UE receives a set of alternative configurations. The UE used one of alternative configurations for procedures such as the cell reselection. The received set of alternative configurations includes multiple configurations for resource priority lists. In one embodiment, the set of configurations are broadcasted to all UEs. Even though each UE receives the same set of configurations, the load balancing and load distribution is achieved by each UE selecting different configurations from the broadcasted set of alternative configurations. The set of alternative configurations includes multiple priority-based resource lists, such as from priority-based resource list-1, list-2 through list-M. Each priority-based resource list includes a list of resources, such as resource-1, resource-2, through resource-N, and corresponding priorities for each resource listed. Each resource in the list of resources is selected from a resource group comprising: a radio frequency, a RAT, and a set of cells.

At step 202, the UE determines whether one or more triggering events are detected to make a new choice of configuration among the alternative configurations. If the algorithm makes a new choice of configuration always results in changed configurations for many UEs, which causes subsequent cell reselections. In such scenario, it is important to make less new configurations. At step 203, the UE selects a new configuration when one or more triggering events were detected. The UE selects the new configuration based on a predefined algorithm. At step 204, the UE performs priority-based cell reselection based on the selected new configuration. The UE go down the list of the selected priority-based resource list and selects the resource that meet predefined requirements with the highest priority on the resource list.

The UE stores the received alternative configuration set. The UE selects and applies a new configuration only upon detects one or more predefined triggering events. FIGS. 3A, 3B, 3C, and 3D illustrated the triggering event.

Figure 3A:
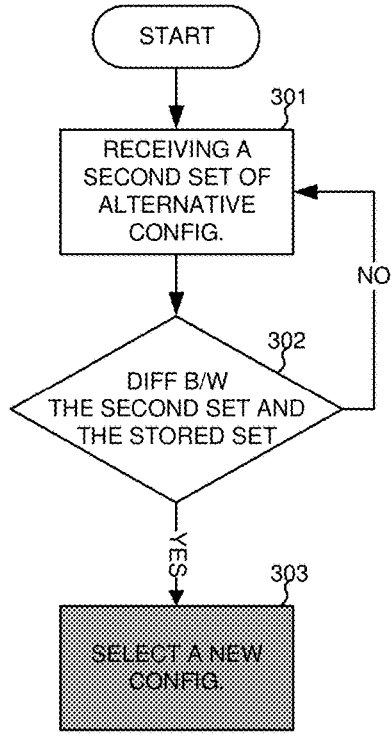
FIG. 3A illustrated an exemplary flow chart for detecting the changed configuration triggering event in accordance with embodiments of the current invention.

FIG. 3A illustrated an exemplary flow chart for detecting the changed configuration triggering event in accordance with embodiments of the current invention. At step 301, the UE receives a second set of alternative configurations. At step 302, the UE determines if there are differences between the second set of alternative configurations and the stored alternative configurations. If step 302 determines no, the UE does not take actions. If step 302 determines yes, the UE selects a new configuration at step 303.

Figure 3B:
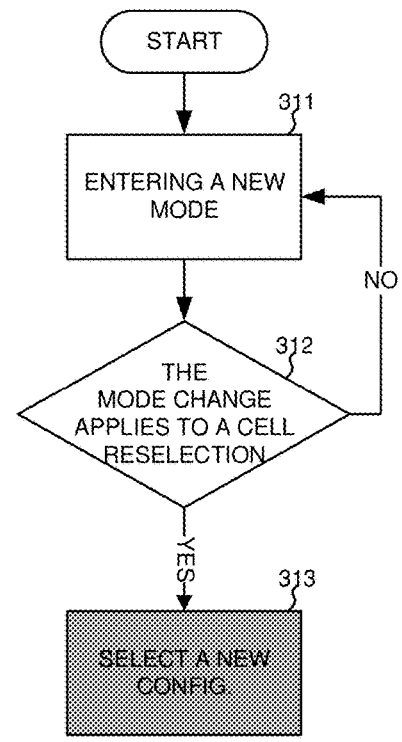
FIG. 3B illustrated an exemplary flow chart for detecting the UE changing of mode related to cell reselection triggering event in accordance with embodiments of the current invention.

FIG. 3B illustrated an exemplary flow chart for detecting the UE changing of mode related to cell reselection triggering event in accordance with embodiments of the current invention. At step 311, the UE enters a new mode. At step 312, the UE determines if mode change applies to a cell reselection. If step 312 determines no, the UE does not take actions. If step 312 determines yes, the UE selects a new configuration at step 313.

Figure 3C:
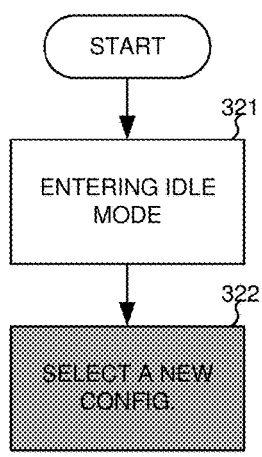
FIG. 3C illustrated an exemplary flow chart for detecting the entering of IDLE mode related to cell reselection triggering event in accordance with embodiments of the current invention.

FIG. 3C illustrated an exemplary flow chart for detecting the entering of IDLE mode related to cell reselection triggering event in accordance with embodiments of the current invention. At step 321, the UE enters the IDLE mode. The UE selects a new configuration at step 322

Figure 3D:
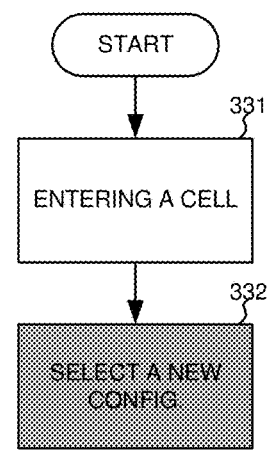
FIG. 3D illustrated an exemplary flow chart for detecting the entering of a new cell related to cell reselection triggering event.

FIG. 3D illustrated an exemplary flow chart for detecting the entering of a new cell related to cell reselection triggering event. At step 331, the UE enters a cell. The UE selects a new configuration at step 332.

Figure 4:
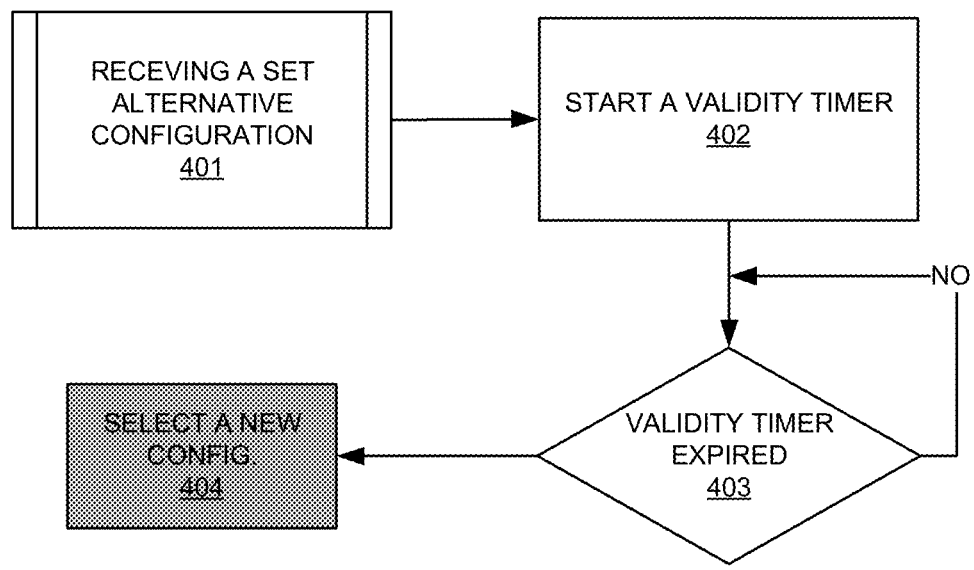
FIG. 4 illustrates an exemplary flow chart of using a validity timer as a triggering event in accordance with embodiments of the current invention.

FIG. 4 illustrates an exemplary flow chart of using a validity timer as a triggering event in accordance with embodiments of the current invention. The validity timer is started upon receiving a set of alternative configurations. At step 401, the UE receives a set of alternative configurations from the network. At step 402, the UE starts the validity timer. At step 403, the UE determines if the validity timer expires. If step 403 determines no, the UE takes no action. If step 403 determines yes, the UE selects a new configuration at step 404.

Figure 5:
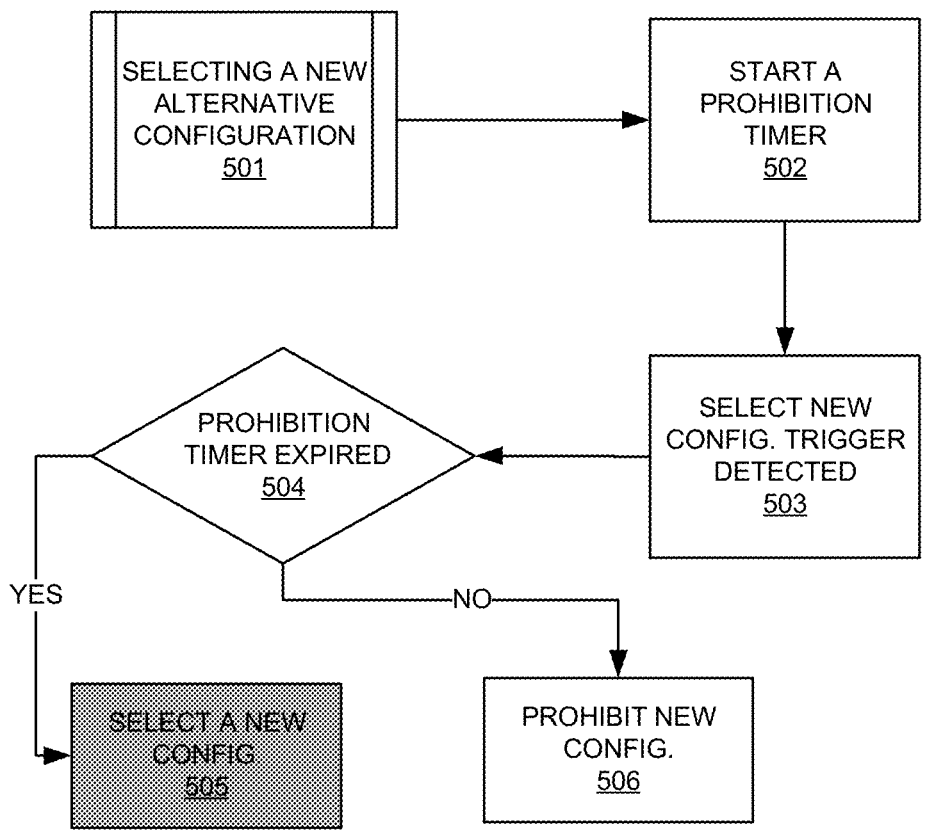
FIG. 5 illustrates an exemplary flow chart of using a prohibition timer to prevent changing the configuration too frequently in accordance with embodiments of the current invention.

FIG. 5 illustrates an exemplary flow chart of using a prohibition timer to prevent changing the configuration too frequently in accordance with embodiments of the current invention. At step 501, the UE selects a new alternative configuration. At step 502, the UE starts a prohibition timer upon selects the new alternative configuration. At step 503, the UE detects one or more triggering events for selecting a new configuration. At step 504, the UE determines if the prohibition timer expires. If step 504 determines no, the UE moves 506 and prohibits the UE from selecting a new configuration. In embodiment, the UE would update a status indicating a selecting of new configuration trigger was received. Upon the expiration of the prohibition timer, the UE selects a new configuration. In another embodiment, upon expiration of the prohibition timer, the UE would not take any action unless another triggering event for selecting a new configuration is received. If step 504 determines yes, the UE selects a new configuration at step 505.

Figure 6:
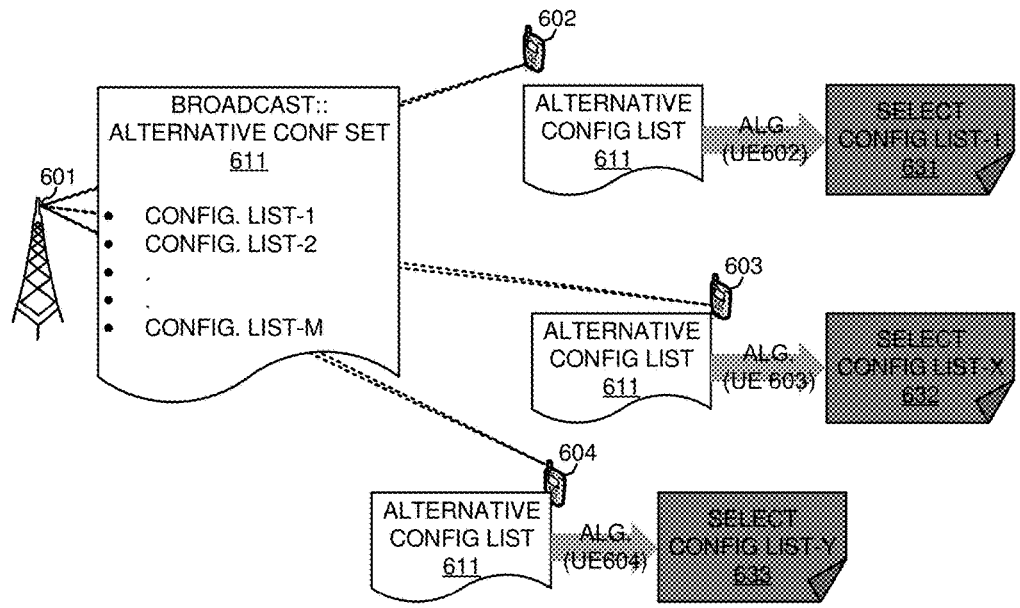
FIG. 6 illustrates an exemplary diagram of different UEs apply different algorithm to the same set of alternative configurations to achieve load balance and load distribution in accordance with embodiments of the current invention.

FIG. 6 illustrates an exemplary diagram of different UEs apply different algorithm to the same set of alternative configurations to achieve load balance and load distribution in accordance with embodiments of the current invention. UEs 602, 603 and 604 connect with an eNB 601. eNB 601 broadcast a set of alternative configurations. The broadcasted alternative configuration set 611 includes multiple configuration lists, such as configuration list-1, configuration list-2 through configuration list-M. UEs 602, 603, and 604 receive the same set of alternative configurations. Each UE applies an algorithm based on one or more identifiers related to the UE. UE 602 applies an algorithm using IDs related to UE 602. UE 603 and UE 604 apply an algorithm using IDs related to UE 603 and UE 604, respectively. After applying different algorithm based on the UE ID, or applying the same algorithm using different UE ID, different UEs selects different configuration list from the set of alternative configurations from the network. At step 631, UE 602 selects configuration list-1 using the algorithm. At step 632, UE 603 selects configuration list-X. At step 633, UE 604 selects configuration list-Y.

By using an algorithm to the set of alternative configurations, different UE will select different configuration list. A preferred such algorithm is a hash function that uses a UE identifier and hashes to a certain hash class X, which is mapped to one configuration in the set of alternative configurations. Using the hash function, the configurations can be changes for UEs with certain hash classes while the configuration can remain the same for UEs of other hash classes. In one embodiment, the hash function returns a value of the UE identifier modular a number of priority classes. For example, there are Y-number of priority classes. The UE with an ID of X uses the hash function to find which configuration to use by apply the priority class number=X modular Y. When the hash function results in a pseudo random distribution, in one embodiment, the network gives certain fraction of the UEs a certain configuration. For example, if the property is fulfilled and the hash function hashes UEs into ten classes, each class will statistically corresponding to ten percent of the UEs. Therefore, it would be possible to make the reconfiguration only applies a fraction of UEs. For example, it is possible to steer the ten percentage of UEs using carrier frequency A to carrier frequency B. If the number of classes increases, the more fine-granular control to the UEs can be achieved. In one embodiment, one or more sub-priority can be mapped to a master priority. The configuration list can use the sub-priority. Each sub-priority corresponds to a master priority. Using the sub-priority, more detailed control can be achieved.

Figure 7:
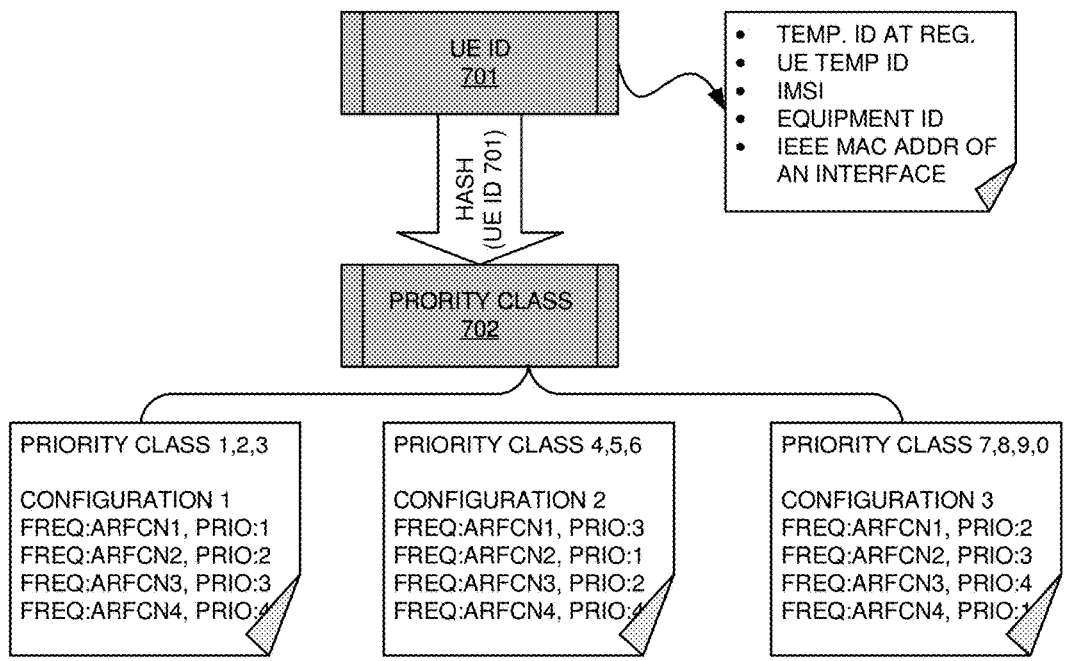
FIG. 7 illustrates an exemplary diagram of the UE uses a hash function to determine the alternative configuration to use in accordance with embodiments of the current invention.

FIG. 7 illustrates an exemplary diagram of the UE uses a hash function to determine the alternative configuration to use in accordance with embodiments of the current invention. The hash function using a UE ID 701 to get a priority class 702. Each priority class corresponds to an alternative configuration. In one embodiment, UE IDs that does not change as the UE moves through the network are used such as the IMSI, the equipment ID (EI), the temporary identity allocated by the core network, such as a mobility management identity, or a MAC identity that is unique, such as an IEEE MAC identity for an interface. The result of the hash function is mapped to a priority class. FIG. 7 also shows an exemplary set of alternative configurations, with three alternative configurations. Configure-1 includes a list of frequencies identified by frequency carrier number (xxFCN) and an associated priority. In the example, each of the configuration is chosen statistically by UEs corresponding to certain hash classes. In this example, there are ten priority classes defined. The item associated with a priority can be a RAT, a certain frequency of a certain RAT, or a set of cells, or a single cell.

Figure 8:
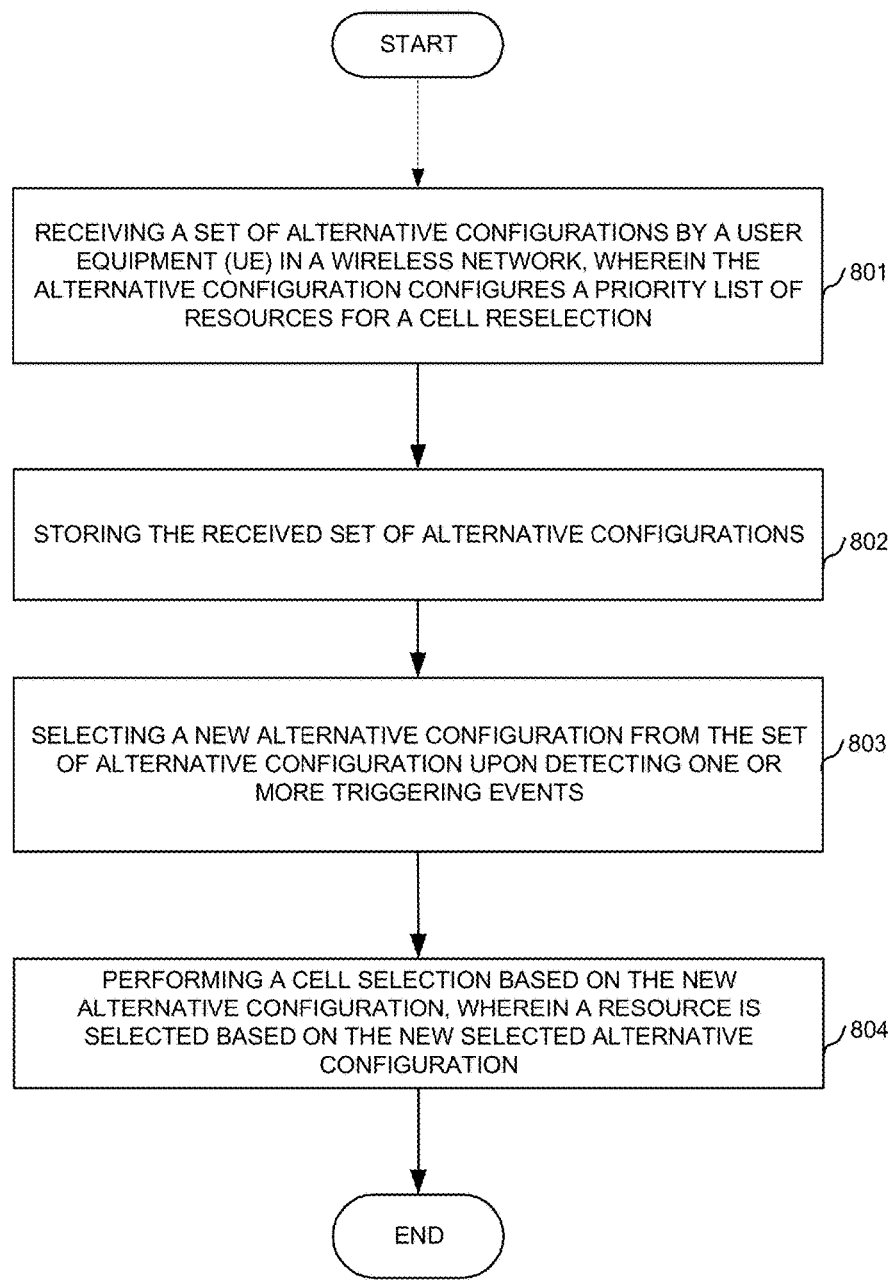
FIG. 8 illustrates an exemplary flow chart of load balancing and load distribution using alternative configurations in accordance with embodiments of the current invention.

FIG. 8 illustrates an exemplary flow chart of load balancing and load distribution using alternative configurations in accordance with embodiments of the current invention. At step 801, the UE receives a set of alternative configurations in a wireless network, wherein the alternative configuration configures a priority list of resources for a cell reselection. At step 802, the UE stores the received set of alternative configurations. At step 803, the UE selects a new alternative configuration from the set of alternative configuration upon detecting one or more triggering events. At step 804, the UE performs a cell selection based on the new alternative configuration, wherein a resource is selected based on the new selected alternative configuration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a set of alternative configurations by a user equipment (UE) in a wireless network, wherein each alternative configuration configures a priority list for a plurality of resources for a cell reselection, and wherein the set of alternative configurations configures the plurality of resources with different priorities in different alternative configuration for load balancing;
storing the received set of alternative configurations;
selecting a new alternative configuration from the set of alternative configurations by the UE based on one or more identifiers related to the UE upon detecting one or more triggering events, wherein the UE selects the new alternative configuration using a hash function based on a UE identifier, wherein the hash function hashes to a priority class and is a value of the UE identifier modular a number of priority classes, and wherein each of the priority classes maps to a respective one of the alternative configurations;
performing a cell selection based on the new alternative configuration, wherein a resource is selected based on the new selected alternative configuration.

2. The method of claim 1, wherein the set of alternative configuration is received from a broadcast signaling channel.

3. The method of claim 1, wherein each alternative configuration comprises a list of resources, and corresponding priorities for each resource listed, wherein each resource in the list of resources is selected from a resource group comprising: a radio frequency, a RAT, and a set of cells.

4. The method of claim 3, wherein a priority maps to a set of sub-priorities, and wherein at least one of the corresponding priority is a sub-priority.

5. The method of claim 1, wherein the triggering events comprises: receiving a second set of alternative configurations that is different from the stored set of alternative configurations, the UE entering a cell, the UE entering an idle mode, and the UE entering another mode where a cell selection is applied.

6. The method of claim 1, wherein the UE identifier is one selecting from an identifier group comprising: a temporary identifier provided to the UE at registration, a temporary identifier, an international mobile subscriber identity (IMSI), an equipment identifier, and an IEEE MAC identifier of an interface of the UE.

7. The method of claim 1, further comprising:
starting a validity timer upon receiving the set of alternative configurations; and
selecting a new alternative configuration upon an expiration of the validity timer.

8. The method of claim 1, further comprising:
starting a prohibition timer upon selecting the new alternative configuration;
prohibiting a second selecting a new alternative configuration before the expiration of timer upon detecting one or triggering events; and
selecting a second alternative configuration upon an expiration of the prohibition timer and one or more triggering events was detected between the start of the prohibition timer and the expiration of the prohibition timer.

9. A user equipment (UE), comprising:
a radio frequency transceiver that transmits and receives radio frequency signal in a wireless network;
a configuration circuit that receives a set of alternative configurations, wherein the alternative configuration configures a priority list for a plurality of resources for a cell reselection, and wherein the set of alternative configurations configures the plurality of resources with different priorities in different alternative configuration for load balancing;
a configuration storage circuit that stores the received set of alternative configuration;
a configuration selection circuit that selects a new alternative configurations from the set of alternative configuration based on one or more identifiers related to the UE upon detecting one or more triggering events, wherein the UE selects the new alternative configuration using a hash function based on a UE identifier, wherein the hash function hashes to a priority class and is a value of the UE identifier modular a number of priority classes, and wherein each of the priority classes maps to a respective one of the alternative configurations; and
a cell selection circuit that performs a cell selection based on the new alternative configuration, wherein a resource is selected based on the new selected alternative configuration.

10. The UE of claim 9, wherein the set of alternative configuration is received from a broadcast signaling channel.

11. The UE of claim 9, wherein each alternative configuration comprises a list of resources, and corresponding priorities for each resource listed, wherein each resource in the list of resources is selected from a resource group comprising: a radio frequency, a RAT, and a set of cells.

12. The UE of claim 11, wherein a priority maps to a set of sub-priorities, and wherein at least one of the corresponding priority is a sub-priority.

13. The UE of claim 9, wherein the triggering events comprises: receiving a second set of alternative configurations that is different from the stored set of alternative configurations, the UE entering a cell, the UE entering an idle mode, and the UE entering another mode where a cell selection is applied.

14. The UE of claim 9, wherein the UE identifier is one selecting from an identifier group comprising: a temporary identifier provided to the UE at registration, a temporary identifier, an international mobile subscriber identity (IMSI), an equipment identifier, and an IEEE MAC identifier of an interface of the UE.

15. The UE of claim 9, further comprising: a validity timer manager that starts a validity timer upon receiving the set of alternative configurations and selects a new alternative configuration upon an expiration of the validity timer.

16. The UE of claim 9, further comprising: a prohibition timer manager that starts a prohibition timer upon selecting the new alternative configuration, prohibits a second selecting a new alternative configuration before the expiration of timer upon detecting one or triggering events, and selects a second alternative configuration upon an expiration of the prohibition timer and one or more triggering events was detected between the start of the prohibition timer and the expiration of the prohibition timer.

* * * * *